United States Patent
Andrew et al.

(10) Patent No.: US 12,319,597 B2
(45) Date of Patent: Jun. 3, 2025

(54) SYSTEMS AND DEVICES FOR CORROSION PREVENTION AND METHODS THERETO

(71) Applicant: Rheem Manufacturing Company, Atlanta, GA (US)

(72) Inventors: Nathan O. Andrew, Notasulga, AL (US); Colben T. Freeman, Notasulga, AL (US)

(73) Assignee: Rheem Manufacturing Company, Atlanta, GA (US)

( * ) Notice: Subject to any disclaimer, the term of this patent is extended or adjusted under 35 U.S.C. 154(b) by 777 days.

(21) Appl. No.: 16/811,020

(22) Filed: Mar. 6, 2020

(65) Prior Publication Data

US 2021/0276890 A1    Sep. 9, 2021

(51) Int. Cl.
    *C23F 13/22*    (2006.01)
    *C02F 1/46*    (2023.01)
    (Continued)

(52) U.S. Cl.
    CPC ........ *C02F 1/4602* (2013.01); *C02F 1/46109* (2013.01); *C23F 13/04* (2013.01);
    (Continued)

(58) Field of Classification Search
    CPC ............ C23F 13/04; C23F 13/22; F24H 9/455
    See application file for complete search history.

(56) References Cited

U.S. PATENT DOCUMENTS

| | | | | | |
|---|---|---|---|---|---|
| 2,298,216 | A | * | 10/1942 | Lamberger | G01G 19/00 73/779 |
| 2,459,123 | A | * | 1/1949 | Bates | C23F 13/14 122/13.01 |

(Continued)

FOREIGN PATENT DOCUMENTS

| | | | | | |
|---|---|---|---|---|---|
| CN | 105840143 | A | * | 8/2016 | C23F 13/10 |
| CN | 109518195 | A | | 3/2019 | |

(Continued)

OTHER PUBLICATIONS

"Microcontroller." Merriam-Webster.com Dictionary, Merriam-Webster, https://www.merriam-webster.com/dictionary/microcontroller. Accessed Oct. 17, 2022. (Year: 2022).*

(Continued)

*Primary Examiner* — Luan V Van
*Assistant Examiner* — Mofoluwaso S Jebutu
(74) *Attorney, Agent, or Firm* — Eversheds Sutherland (US) LLP

(57) ABSTRACT

The present application provides corrosion prevention devices comprising a sacrificial anode and a mass sensor and corrosion prevention devices comprising a controller in communication with the mass sensor and sacrificial anode. The controller can be configured to receive mass data to detect when the mass of the sacrificial anode has fallen below a predetermined threshold. Upon determining that the mass has fallen below the predetermined threshold, the controller can designate that the sacrificial anode is depleted. In response, the controller can output instructions for performing one or more corrective actions to protect the desired structure from corrosion.

9 Claims, 5 Drawing Sheets

(51) Int. Cl.
*C02F 1/461* (2023.01)
*C23F 13/04* (2006.01)
*F24H 9/45* (2022.01)

(52) U.S. Cl.
CPC ............. *C23F 13/22* (2013.01); *F24H 9/455* (2022.01); *C02F 2001/46171* (2013.01); *C02F 2201/46145* (2013.01); *C02F 2209/02* (2013.01); *C02F 2209/40* (2013.01); *C02F 2303/22* (2013.01)

(56) References Cited

U.S. PATENT DOCUMENTS

| | | | | |
|---|---|---|---|---|
| 3,179,734 | A * | 4/1965 | Redel | H05B 7/109 |
| | | | | 373/70 |
| 7,387,713 | B2 | 6/2008 | Marcelino et al. | |
| 10,895,566 | B1 * | 1/2021 | Teepe | G01R 31/62 |
| 2004/0222084 | A1 | 11/2004 | Wigg et al. | |
| 2007/0023295 | A1 * | 2/2007 | Dowling | C23F 13/14 |
| | | | | 204/196.12 |
| 2011/0240485 | A1 * | 10/2011 | Palmer | C23F 13/18 |
| | | | | 204/196.01 |
| 2014/0216945 | A1 * | 8/2014 | Farris | G01N 17/02 |
| | | | | 205/726 |
| 2017/0193794 | A1 * | 7/2017 | Farris | G08B 21/182 |
| 2019/0360108 | A1 | 11/2019 | Oshaug Aasen et al. | |

FOREIGN PATENT DOCUMENTS

| | | | | | |
|---|---|---|---|---|---|
| DE | 102013225827 | A1 * | 6/2015 | ............. | C23F 13/06 |
| EP | 3498885 | A2 * | 6/2019 | ............. | B63B 59/00 |
| JP | 2006349535 | A * | 12/2006 | | |
| JP | 2009008628 | A * | 1/2009 | | |
| JP | 2016017201 | A * | 2/2016 | ............. | C23F 13/00 |
| TW | M529137 | U * | 9/2016 | ............. | F24H 9/20 |
| WO | WO-02059394 | A2 * | 8/2002 | ............. | C23F 13/16 |
| WO | WO-2021087089 | A1 * | 5/2021 | ............. | C23F 13/22 |

OTHER PUBLICATIONS

Fraden, J. (2016). Force and Strain. In: Handbook of Modern Sensors. Springer, Cham. (Year: 2016).*

International Search Report and Written Opinion for PCT Application No. PCT/US2021/020794 mailed Jun. 3, 2021.

* cited by examiner

SYSTEMS AND DEVICES FOR CORROSION PREVENTION AND METHODS THERETO

FIELD OF THE DISCLOSURE

The present disclosure relates generally to corrosion prevention devices, systems, and methods. Particularly, examples of the present disclosure relate to corrosion monitoring of sacrificial anodes in water tank systems.

BACKGROUND

Cathodic protection systems can be employed to prevent corrosion of metal structures exposed to an electrolytic environment. Cathodic protection can be implemented for marine, hydro-intensive, or subterranean corrodible structures by electrically connecting the corrodible structure to one or more sacrificial anodes constructed of a metal that is higher in the electromotive series than the protected structure, i.e. a metal that is anodic to the material of the protected structure. When the protected structure and the electrically connected sacrificial anode are both disposed within the same electrolytic environment (e.g., earth or water containing free positive ions), a galvanic cell is formed in which the protected structure is the cathode.

Metal atoms on the exposed surface of the sacrificial anode are ionized by the surrounding electrolyte and go into solution with the electrolyte, thereby corroding the sacrificial anode. Due to the difference in electrical potential between the cathodically protected metal and the sacrificial anode, electrons produced by the electrochemical corrosion reaction of the anode flow as an electrical current through the electrical connection between the sacrificial anode and the protected structure. When electrons reach the protected structure, they combine with positive ions in the electrolyte at the surface of the protected structure. The protected structure does not typically corrode since the positive ions associate with the free electrons readily available at the surface of the protected structure, which positive ions would otherwise initiate a corrosion reaction at the surface of the protected structure.

Cathodic protection systems can be capable of protecting the corrodible structure from corrosion so long as a sufficient amount of sacrificial anode metal remains to supply electrons to the protected structure. When an anode has corroded beyond a certain extent, it must be replaced in order for the cathodic protection system to protect the corrodible structure. The corrosion rate of the sacrificial anode, and thus the useful life of the sacrificial anode, is difficult to predict since it is influenced by a number of variable factors such as, for example, the composition of the surrounding soil or water and localized variations in that composition.

SUMMARY

These problems are addressed by the disclosed technology, as are other needs that will become apparent upon reading the description below in conjunction with the drawings. The present disclosure relates generally to corrosion prevention devices, systems, and methods thereto and, particularly, examples of the present disclosure relate to corrosion monitoring of sacrificial anodes in water tank systems.

The disclosed technology includes a corrosion prevention device that can include a sacrificial anode and a mass sensor connected to the sacrificial anode. The mass sensor can be configured to detect a mass of the sacrificial anode such as by measuring a strain corresponding to the mass of the sacrificial anode. The mass sensor can be disposed within the sacrificial anode.

The corrosion prevention device can include a controller in communication with the mass sensor. The controller can be configured to control a water system. The controller can receive, from the mass sensor, mass data that is indicative of a current mass of the sacrificial anode. Based on the mass data, the controller can determine whether the current mass of the sacrificial anode is below a predetermined threshold. If the current mass is below the predetermined threshold, the controller can output instructions to perform one or more corrective actions. The predetermined threshold can be determined by the controller or manually input. For example, the controller can receive a user input from a user interface indicative of the predetermined threshold. The predetermined threshold can also include a first threshold and a second threshold, and the first threshold can be associated with one or more corrective actions that is/are different than the one or more corrective actions that is/are associated with the second threshold.

The corrective actions can include, for instance, transmitting a notification to the user interface, transmitting instructions to the water system to shut down at least one component of the water system, transmitting instructions to the water heater to reduce a heat output of the water heater, or transmitting instructions to the pump to reduce a flow rate of water through the water system.

The controller can include various components, such as a transceiver, one or more processors, and memory configured to store instructions. The controller can communicate with the user interface, and the memory can store additional instructions, such as instructions for instructing the transceiver to transmit a notification to a manufacturer of the water system to schedule a maintenance call for the water system. The transceiver can be in communication with the manufacturer through a network. The controller can also schedule a delivery of a replacement sacrificial anode.

These and other aspects of the disclosed technology are described herein along with the accompanying figures. Other aspects, features, and elements of the disclosed technology will become apparent to those of ordinary skill in the art upon reviewing the following description of specific examples of the disclosed technology. While features of the disclosed technology may be discussed relative to certain examples and figures, the disclosed technology can include one or more of the features or elements discussed herein. Further, while one or more examples may be discussed as having certain advantageous features, one or more of such features may also be used with the various other examples of the disclosure discussed herein. In similar fashion, while certain examples, implementations, and embodiments may be discussed below with respect to a given device, system, or method, it is to be understood that such examples can be implemented in various other devices, systems, and methods of the present disclosure.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner.

DETAILED DESCRIPTION

Figure 1:
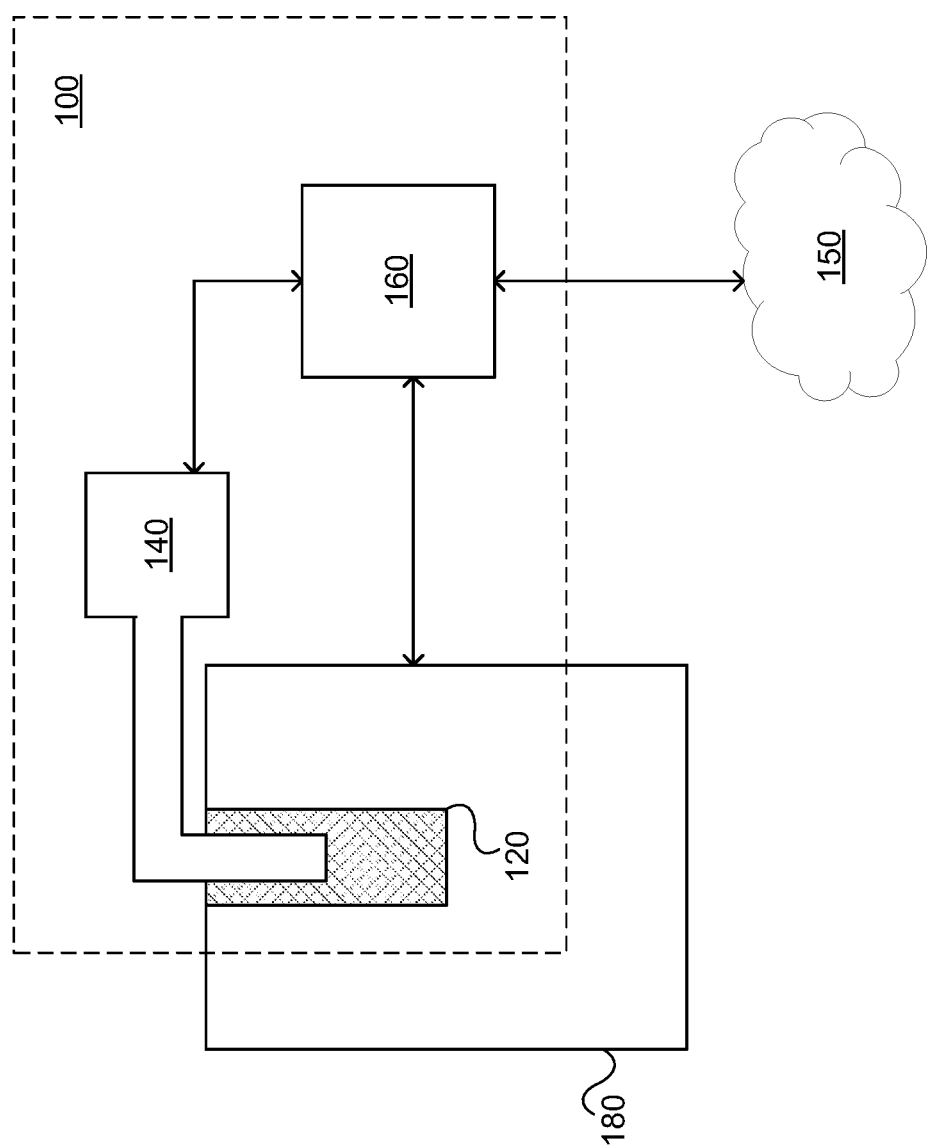
FIG. 1 illustrates a system diagram of a corrosion prevention system, in accordance with the present disclosure.

Sacrificial anodes are used in cathodic protection systems to protect corrodible structures from corrosion so long as a sufficient amount of sacrificial anode is present. When an anode has corroded beyond a certain extent, it can cease to provide adequate corrosive protection and must be replaced. Current systems are generally unable to detect the loss of anode volume or to determine when the connected corrodible structure is at risk of corrosive damage. Further, the corrosion rate of the sacrificial anode, and thus the useful life of the anode, is difficult to predict as it can be influenced by a number of variable factors.

Some systems may supplement the function of a cathodic protection system by applying a protective coating to the exterior of the cathodically protected structures to reduce the exposure of the protected structure to the electrolytic environment. However, a protective coating to the exterior of the cathodically protected structures may not adequately isolate the protected structure from the electrolyte because small cracks or discontinuities in the coating can develop as the coating ages, which can allow the exposed portion of the structure to become corroded. Such coatings are generally imperfect solutions and may be unable to provide full and complete corrosive protection due to these and other imperfections. Further, such a coating is incapable of perfectly isolating the corrodible structure from positive ions in the surrounding electrolyte as some of the positive ions are capable of diffusion or migration through the protective coating itself.

The disclosed technology provides devices, systems, and methods for preventing corrosion in systems such as irrigation, residential pools, commercial pools, sewage, hydroponics, potable water, water purification, distillation, residential water supply, marine, subterranean, and the like. The disclosed technology includes devices, systems, and methods for monitoring the useful life of a sacrificial anode, which can solve one or more of the problems discussed herein, among others. For example, the disclosed technology includes a sacrificial anode monitoring system including a mass sensor connected to a sacrificial anode. The mass sensor can measure the mass of the sacrificial anode. For instance, the mass sensor can comprise a strain gauge configured to measure strain associated with an object's mass (e.g., the gravitational force exerted on an object, such as the sacrificial anode, that is connected to the mass sensor). The disclosed technology includes determining, based on the measured mass, the extent to which the sacrificial anode has become depleted. If the mass of the sacrificial anode falls below a predetermined threshold, it can be determined that the useful life of the sacrificial anode has expired. In response to determining that the sacrificial anode is, or is close to, depleted, the devices, systems, and methods of the present disclosure can include outputting instructions to perform one or more corrective actions. For example, the system can enter emergency shut down procedures if the sacrificial anode becomes depleted. Such examples of the present disclosure can therefore provide corrosion prevention devices, systems, and methods utilizing adaptive monitoring of sacrificial anodes combined with system controls to extend the lifetimes and reduce the damage potentials of such corrosive systems.

Although certain examples of the disclosure are explained in detail, it is to be understood that other examples or applications of the disclosed technology are contemplated. Accordingly, it is not intended that the disclosure is limited in its scope to the details of construction and arrangement of components set forth in the following description or illustrated in the drawings. Other examples or applications of the disclosure are capable of being practiced or carried out in various ways. Also, in describing the examples, specific terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Reference will now be made in detail to examples of the disclosed technology, such as those illustrated in the accompanying drawings. Wherever convenient, the same references numbers will be used throughout the drawings to refer to the same or like parts.

FIG. 1 illustrates a corrosion prevention system 100 in accordance with the present disclosure. By way of illustration and not limitation, the corrosion prevention system 100 in FIG. 1 is illustrated as protecting a corrodible structure in the form of a water tank 180. The water tank 180 can be used in, for example, a water heater system in a user's home. The disclosed technology can be used with various other corrodible structures, such as water heaters for pools or any other structure that is corrodible. As shown, the corrosion prevention system 100 can comprise a sacrificial anode 120, a mass sensor 140, and a controller 160. Additionally, the corrosion prevention system 100 can be in communication with a network 150. It is to be understood that the sacrificial anode 120, the mass sensor 140, and the controller 160 need not be located in a water tank 180 and can be instead located in other locations and environments, depending on the corrosive structure to be protected. For instance, the sacrificial anode 120 can be a separate and distinct device located in pipes, tanks, underground exteriors, or other corrosive environments while remaining in communication with the mass sensor 140 and the controller 160. Alternatively or additionally, the sacrificial anode 120, the mass sensor 140, and the controller 160 can be integrated into a single device. Other configurations are contemplated. Other components can be present, such as pumps, heaters, boilers, filters, valves, heat exchangers, diverters, coolers and the like.

The sacrificial anode 120 can be located in any corrosive environment of the desired structure. For example, as illustrated, the sacrificial anode 120 can be located inside of the water tank 180. The sacrificial anode 120 can be placed in any position such that the sacrificial anode 120 is in contact with the same fluid environment (i.e., corrosive environment) as the corrodible structure. The sacrificial anode 120 can also be electrically connected to the corrodible structure, such as via a bonding wire or some other electrical connector. Alternatively or in addition, the sacrificial anode 120 can simply be in direct contact with the corrodible structure. The electrical connection between the sacrificial anode 120 and the corrodible structure (e.g., the bonding wire) can be configured to provide an electron pathway between the sacrificial anode 120 and the corrodible structure, and the corrosive environment (e.g., fluid) can itself provide an ion pathway between the corrodible structure, the corrosive materials of the corrosive environment, and the sacrificial anode 120. Accordingly, a closed circuit can be formed, such that the sacrificial anode 120 can be corroded by the corrosive environment instead of the corrodible structure.

The sacrificial anode 120 can be configured to supply electrons to the protected structure. That is to say, the sacrificial anode 120 can comprise a material with a higher electromotive potential than the material of the protected structure when placed in an electrolyte (e.g., corrosive environment). As used herein, the term "electrolyte" refers to a corrosive environment capable of transferring electrons away from the sacrificial anode 120 and transporting them to a surface of the protected structure (e.g., water tank 180). For example, an "electrolyte" can be water in a water tank or soil surrounding an underground pipe. By way of another example, sea water can act as an electrolyte in contact with the hull of a boat. In such a manner, a veritable electric current is formed, transferring electrons away from the sacrificial anode 120, through the electrolyte, and on to the surface of the protected structure (e.g., water tank 180). Such a transfer of electrons can corrode the sacrificial anode 120 while reducing the ability for corrosive oxidation reactions to occur on the surface of the protected structure.

The corrosion of the sacrificial anode 120 by the electrolyte can reduce the mass of the sacrificial anode 120. Therefore, the sacrificial anode 120 can be in communication with a mass sensor 140. The mass sensor 140 can be disposed on, near, or within the sacrificial anode 120. For example, the mass sensor 140 can be disposed in an interior channel cut into the sacrificial anode 120. The mass sensor 140 can be a variety of sensors based on the configuration of the sacrificial anode 120. For example, if the sacrificial anode 120 is disposed on the top of a protected structure, as shown in FIG. 1, the mass sensor 140 can include a strain gauge (e.g., load cell) to measure the strain exerted by the gravitational force acting on the mass of the sacrificial anode 120. Alternatively, or additionally, if the sacrificial anode 120 is disposed on a bottom surface of a protected structure, the mass sensor 140 can include a pressure plate (or other compressive-force-detecting sensor) to measure the weight exerted by the gravitational force acting on the mass of the sacrificial anode 120. Other configurations are contemplated and considered to be within the scope of the present disclosure.

The mass sensor 140 can be integrated into the sacrificial anode 120, as described above. Alternatively or additionally, the mass sensor 140 can be included in a separate and distinct modular connection to the sacrificial anode 120. That is to say that a user can easily attach and/or detach the mass sensor 140 to the sacrificial anode 120. In such a manner, a user can easily remove the mass sensor 140 for cleaning and/or maintenance, replace the mass sensor 140, and/or periodically attach the mass sensor 140 for occasional measurements rather than continuous measurements. A variety of connectors can be used in conjunction with the mass sensor 140 to detachably attach the mass sensor 140 to the sacrificial anode. Connectors such as screw threads, clips, latches, and the like can be used. Alternatively, or additionally, the mass sensor 140 can be made integral with the sacrificial anode 120, such as by drilling a hole, inserting the mass sensor 140, and sealing the hole.

The mass sensor 140 can include a communication module that can communicate with one or more components of the corrosion prevention system 100 (e.g., the controller 160). The communication module of the mass sensor 140 can be configured to communicate wirelessly using any useful method or technology or via wired communication. As an example, the mass sensor 140 can be configured to communicate via the communication module with the controller 160 of the corrosion prevention system 100. As additional examples, the mass sensor 140 can be configured to electrically communicate with other components of the corrosion prevention system 100, such as burners, pumps, heat pumps, hydronic units, valves, and the like.

The mass sensor 140 can also communicate with the controller 160. The controller 160 can include a communication module that can communicate with one or more components of the corrosion prevention system 100 (e.g., the mass sensor 140 and the network 150). The communication module of the controller 160 can be configured to communicate wirelessly using any useful method or technology or via wired communication. As an example, the controller 160 can be configured to communicate via the communication module with the mass sensor 140 of the corrosion prevention system 100. As additional examples, the controller 160 can be configured to electrically communicate with other components of the corrosion prevention system 100 and/or one or more components of the protected structure (e.g., burners, pumps, heat pumps, hydronic units, valves, and the like). The controller 160 and the mass sensor 140 can be contained together as one component of the corrosion prevention system 100. Alternatively, or additionally, the controller 160 and the mass sensor 140 can be separate and distinct components that can be in communication.

The controller 160 can receive mass data from the mass sensor 140 via the communication module. The mass data can be indicative of a mass or weight of the sacrificial anode 120 as measured or detected by the mass sensor 140. Using the mass data, the controller 160 can be capable of determining if and/or when the sacrificial anode 120 has been depleted. For example, if the mass sensor 140 measures the strain exerted by gravity acting on the anode, and the controller 160 determines that the strain has fallen below a predetermined mass threshold or weight threshold, the controller 160 can indicate that the sacrificial anode 120 has become depleted. In response, the controller can output one or more corrective actions. The controller 160 can compare the mass data to multiple mass or weight thresholds, with each mass or weight threshold corresponding to a predetermined amount of depletion and/or a predetermined remaining amount of the sacrificial anode 120 (which can indicate a remaining useful life of the sacrificial anode 120). The threshold(s) can be based on historical data. The historical data can indicate the mass of previous sacrificial anodes and the corresponding remaining useful life of each anode. The controller 160 can be configured to determine the threshold(s) based on the historical data.

The corrective actions can be, for example, emergency shutdown of the system associated with the corrosion prevention system 100, and/or transmitting an alert to a user of the corrosion prevention system 100 that the sacrificial anode 120 is depleted. By way of another example, if the controller 160 determines that the sacrificial anode 120 is depleted, the controller can utilize the network 150 to schedule a maintenance call with the manufacturer to replace the sacrificial anode 120 and/or automatically place an order for a replacement sacrificial anode 120. Corrective actions can include such actions as: emergency shut down some or all of the system in the corrosive environment (e.g., shutting down a water heater system), altering a flow rate (e.g., adjusting performance of one or more pumps), altering a temperature (e.g., adjusting performance of a burner), and the like.

Figure 2A:
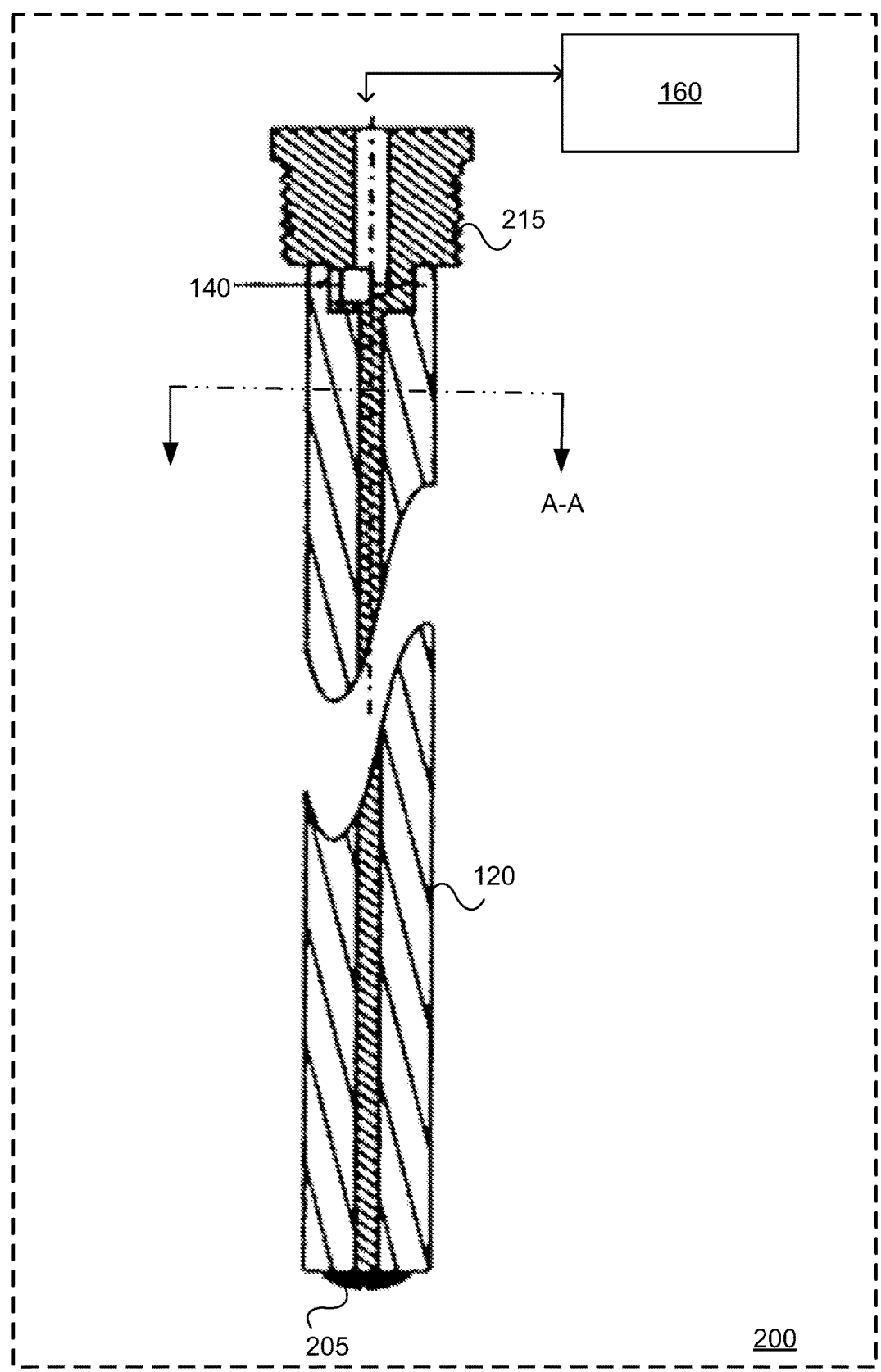
FIG. 2A illustrates a cross-sectional view of a corrosion prevention device, in accordance with the present disclosure.

FIG. 2A illustrates a corrosion prevention device 200 comprising a sacrificial anode 120 and a mass sensor 140. A support shaft can extend through the sacrificial anode 120 (e.g., axially extend through the center of the sacrificial anode 120). The support shaft can extend from one end of the sacrificial anode 120 and/or can have an attachment device, mechanism, or design such that the sacrificial anode 120 can be attached (e.g., via the end of the support shaft) to an object. A weld cap 205 can be attached or affixed to the opposite end of the support shaft. The weld cap 205 can abut the end surface of the sacrificial anode 120 and can help prevent the sacrificial anode 120 from falling off the shaft as the sacrificial anode 120 depletes. The corrosion prevention device 200 can comprise a seal 215 to seal the mass sensor within the sacrificial anode 120 and/or affix the mass sensor 140 to the sacrificial anode 120.

Figure 2B:
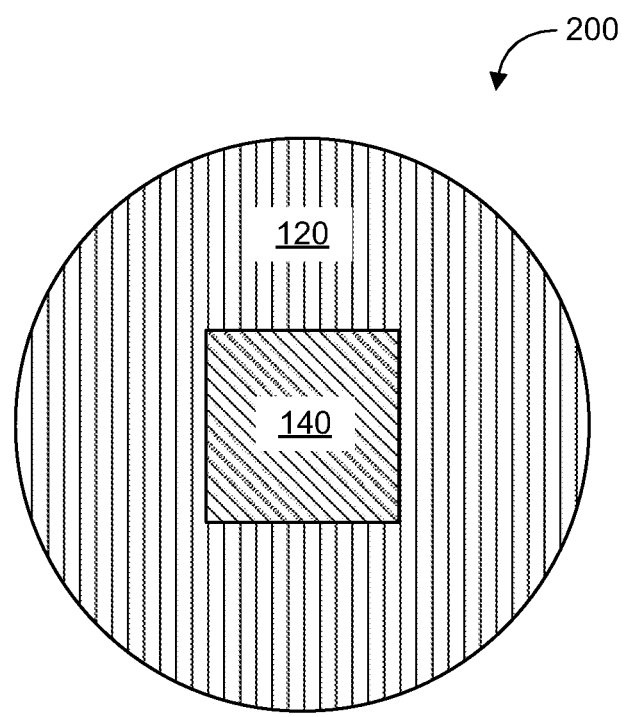
FIG. 2B illustrates a cross-sectional view of a corrosion prevention device, in accordance with the present disclosure.

As shown in FIG. 2A, and similarly in FIG. 2B, the mass sensor 140 can be contained in an interior channel of the sacrificial anode 120 (e.g., within or as a part of the shaft). Alternatively, the mass sensor 140 can be separate from the shaft and can be located above, below or in other location relative the sacrificial anode 120 such that the mass sensor can measure and/or detect the mass of the sacrificial anode 120. The mass sensor 140 can also be grounded to prevent electrical current from influencing readings or other electrical equipment of the mass sensor 140. The mass sensor 140 can be in communication with the controller 160 (e.g., connected to the controller 160 as part of the corrosion prevention device 200, communicating with the mass sensor 140 as a separate and distinct device).

As discussed above, the sacrificial anode 120 can comprise a material selected to have a higher electromotive potential than the protected structure. In other words, the sacrificial anode 120 can have a higher oxidation potential to prevent the protected structure from undergoing oxidation reactions. For example, the sacrificial anode 120 can comprise, magnesium, aluminum, zinc, or combinations thereof.

Alternatively or additionally, the sacrificial anode 120 can comprise any metal so long as the selected metal provided there is a sufficient difference in electrochemical potential between the selected metal and the protected structure. For instance, iron anodes can be used to protect copper structures. By way of another example, magnesium anodes can be used to protect porcelain water tanks.

By way of illustration, and not limitation, FIG. 2B illustrates the mass sensor 140 disposed in an interior channel of the sacrificial anode 120. In FIG. 2B, it is illustrated that the mass sensor 140 and the sacrificial anode 120 can share a longitudinal axis. It is to be understood that the mass sensor 140 can be placed in a variety of configurations within the sacrificial anode 120 so long as the mass sensor 140 is in communication with the sacrificial anode 120.

Figure 3:
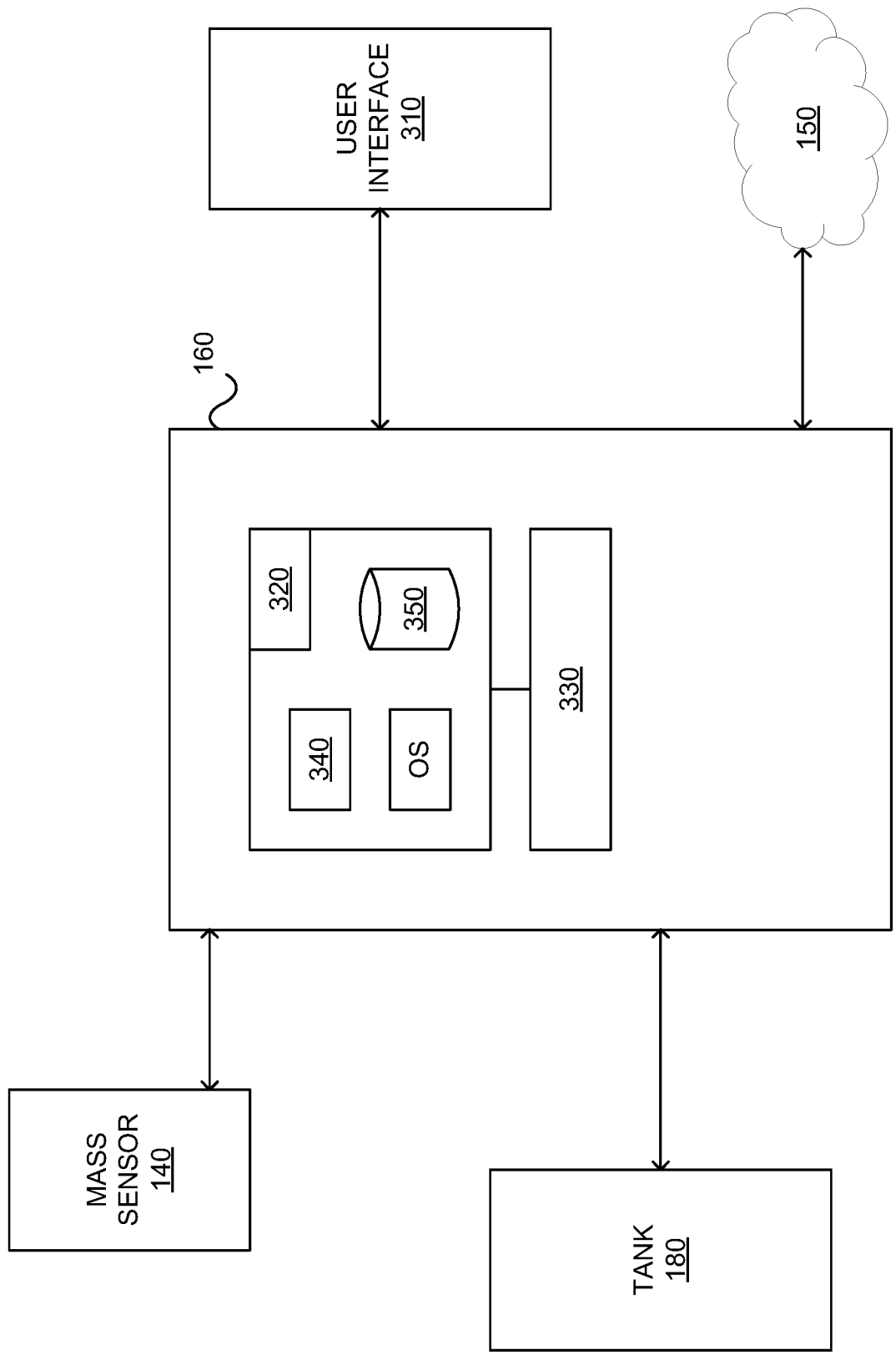
FIG. 3 illustrates a component diagram of a corrosion prevention device, in accordance with the present disclosure.

As shown in FIG. 3, the corrosion prevention device 200 (and/or the mass sensor 140) can be in communication with a controller 160 in accordance with the present disclosure. As described above, the controller 160 can be in wired and/or wireless communication with the mass sensor 140, the sacrificial anode 120, and/or various components of the protected structure and/or system (e.g., water tank 180), such as heaters, burners, heat exchangers, or other system components such as pumps, valves, and the like. The controller 160 can also be in communication with a user interface 310. The user interface 310 can be configured to transmit information to, and receive information from, the controller 160. Some or all of the user interface 310 can be integrated with the controller 160, such as a keypad and/or touchscreen, or some or all of the user interface 310 can be separate but in electrical communication with the controller 160. For example, the user interface 310 can be provided by a program or application on a mobile, a tablet, a personal computer, and the like. The user interface 310 can alternatively, or additionally, comprise a keypad for user input, as well as a screen to provide information to the user. The user interface 310 can be directly in communication with the controller 160, as shown, but it is understood that the user interface 310 can be provided separately in communication with the controller 160, such as on a mobile device. For example, the user interface 310 can be provided as an application on a mobile device, communicating with the controller 160 via the network 150. The application can also be configured to transmit interactions to the controller 160 from the user device (e.g., setting a predetermined threshold, shutting down).

As shown, the controller 160 can comprise one or more processors 320, a transceiver 330 in communication with the mass sensor 140 and the processors 320, and a memory 340 in communication with the one or more processors 320. The components described herein can further be in electrical communication with each other, as well as with other components of the controller 160. The memory 340 can store various instructions, programs, databases, machine learning algorithms, models, and the like, such as an operating system (OS). The memory 340 can communicate with the processors 320 to, for instance, execute programs, store data, communicate with other components, and the like. The processors 320 can also facilitate external communication via the other components of the controller 160. For example, the processors 320 can communicate via the transceiver 330 over a network 150 with various systems, such as a security system or a data logging system. The processors 320, via the transceiver 330, can also be in communication with one or more storage devices 350 for storing datasets, documents, instructions, programs, and the like. The one or more storage devices 350 can also be internally contained in the controller 160, as shown.

The controller 160 can be any analog or non-analog controller. For instance, the controller 160 can comprise one or more switches configured to affect desired changes to the corrosion prevention system 100 and/or the corrosion prevention device 200. In such a manner, the controller 160 can output one or more corrective actions to be implemented on the protected system (e.g., the water tank 180) by the controller 160.

The transceiver 330 can receive data from the mass sensor 140. In such a manner, a pipeline of data can be constructed by receiving data from the mass sensor 140, processing the data at the controller 160, and outputting one or more corrective actions, if necessary. The transceiver can also receive data from other sensors, such as pH sensors, oxidation reduction potential (ORP) sensors, flow rate sensors, concentration sensors, viscosity sensors, density sensors, temperature sensors, pressure transducers, and any sensors known to measure a desirable property of protected structure in addition to the mass sensor 140.

The controller 160 can determine when and/or to what extent the sacrificial anode 120 is depleted and remedy the protected structure with one or more corrective actions. The corrective actions can be taken by the controller 160 if the mass of the sacrificial anode 120 is determined to be below a predetermined threshold. The predetermined threshold can be calculated from an average mass detected by the mass sensor 140, or the predetermined threshold can be a hard value inputted to the controller 160 (e.g., at the user interface 310).

Upon determining that the mass of the sacrificial anode 120 has fallen below the predetermined threshold, the one or more corrective actions can be output by the controller 160. The corrective actions, for example, can be emergency shutdown of the system associated with the corrosion prevention system 100, and/or transmitting an alert to a user of the corrosion prevention system 100 that the sacrificial anode 120 is depleted. By way of another example, if the controller 160 determines that the sacrificial anode 120 is depleted, the controller can utilize the network 150 to schedule a maintenance call with the manufacturer to replace the sacrificial anode 120. The controller 160 can also be configured to transmit alerts to the user. The controller 160 can transmit alerts via the network 150 and/or the user interface 310. For instance, the controller 160 can prompt a display and audible alarm to sound from the user interface 310, or the controller can transmit a push notification to a user's mobile device via the network 150.

While the following methods are described with reference to the corrosion prevention system 100, it is understood that one or more method steps or whole methods can be performed by other systems (e.g., corrosion prevention device 200, controller 160), general-purpose computers, computer operators, and the like.

Figure 4:
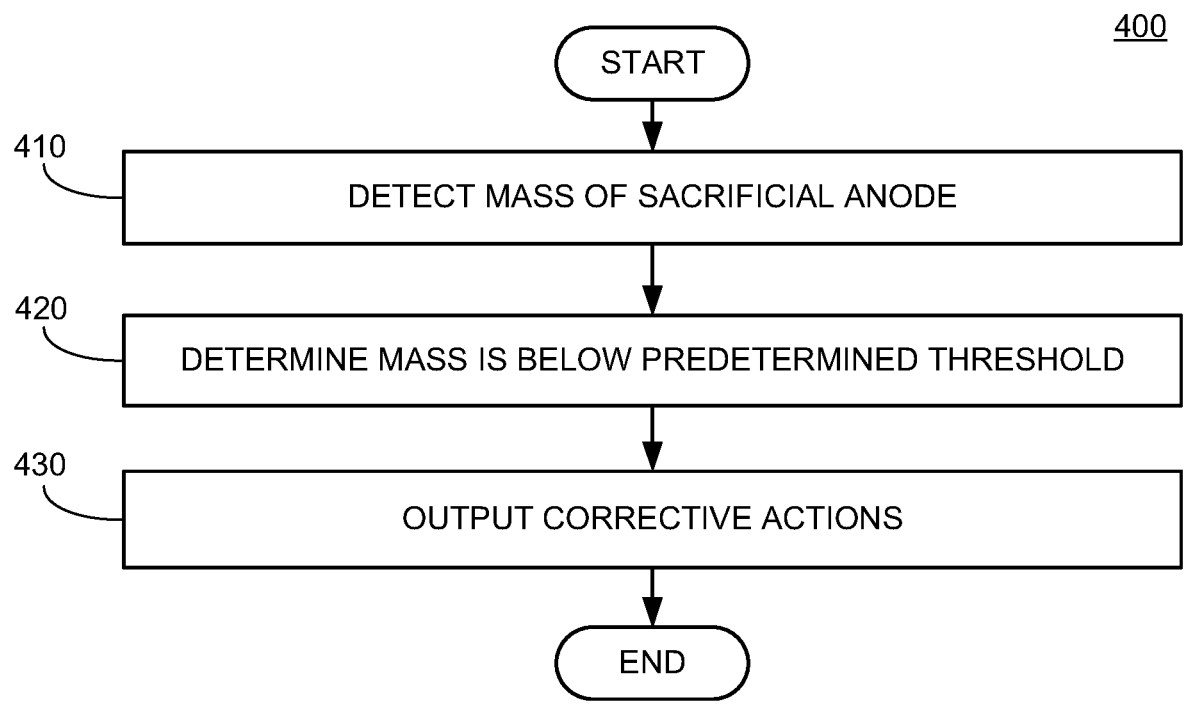
FIG. 4 illustrates a method of monitoring corrosion of a sacrificial anode, in accordance with the present disclosure.

FIG. 4 illustrates a method of monitoring corrosion of a sacrificial anode 120 in accordance with the present disclosure. As shown in block 410, the mass sensor 140 can detect a mass of the sacrificial anode 120. The controller 160 can receive the measure data and can then process, store, and/or transmit the measured data for further use (e.g., transmitting mass data to a manufacturer of sacrificial anodes to create historical usage data). It is understood that other properties can be measured and received by the controller 160 from various other sensors, such as pH, ORP, flow rate, concentration, and temperature.

In block 420, the controller 160 can determine that the mass of the sacrificial anode is below a predetermined threshold. The predetermined threshold can be manually input by a user, hard-coded into the controller by the manufacturer, or calculated based on measured data. The determining and calculating can be performed by the controller 160 using, for example, one or more processors. The controller 160 can also determine the predetermined threshold by analyzing stored data in the memory. The historical data can be logged or stored, for example, in the one or more storage devices, and retrieved by the controller 160 when needed. Alternatively or additionally, the historical data can be stored in a separate database from the controller 160 and retrieved via the network 150 and the transceiver 330. For instance, a manufacturer of sacrificial anodes can store historical data at a local database for a plurality of sacrificial anodes currently in use. Alternatively, the predetermined threshold can be a particular value (e.g., a user-inputted value). For example, a user can set the mass of the sacrificial anode 120 to never fall below 8 ounces. As another example, a user can set the threshold to reflect a certain amount of remaining useful life of the sacrificial anode or a percentage of the useful life of the sacrificial anode. In order to obtain the mass data from the mass sensor 140, the controller 160 need not have to receive specifically mass data. For example, the controller 160 can receive force data in the form of strain data and calculate the mass of the sacrificial anode 120 from the strain data.

In block 430, the controller 160 can output one or more corrective actions in response to determining that the mass of the sacrificial anode 120 has fallen below the predetermined threshold. The controller 160 can output the corrective actions to the protected structure or any component thereof (e.g., the water heater of a residential water system). The one or more corrective actions can comprise actions to preserve the protected structure. For example, the controller 160 can instruct one or more components (or a user/technician) to add water softener to the protected structure to slow the corrosion rate. By way of another example, the controller 160 can instruct one or more pumps to reduce a flow rate through the protected structure. The one or more corrective actions can include, as non-limiting examples, emergency shut down of, altering a flow rate, altering a temperature, and the like.

Upon detecting that the sacrificial anode 120 is depleted, the controller 160 can further transmit (e.g., via the transceiver 330) an alert to the user interface 310. The alert can be, for example, a blinking light, a warning on the screen, or an audible siren. The alert can comprise a value for the mass of the sacrificial anode 120, the one or more corrective actions, and other data (e.g., calculated time to completely corrode the sacrificial anode 120 based on the measured corrosion rate). The controller 160 can automatically implement the one or more corrective actions, but the controller 160 can also wait for user input before implementing the corrective actions. The user can indicate that the measured mass is erroneous and instruct the system to take no action. Alternatively, the user can instruct an emergency shutdown of the system if desired. The controller 160 can receive the instructions from the user interface 310 or a user device and subsequently implement the desired corrective actions via output of instructions to the appropriate component(s). The method 400 can terminate after block 430. However, the method 400 can alternatively continue on to other method steps not shown. For example, the method 400 can then return to block 410 upon terminating block 430. In such a manner, continuous monitoring and correction of sacrificial anode corrosion in corrosion prevention systems can be achieved.

As used in this application, the terms "module," "server," "processor," "memory," and the like are intended to include one or more computer-related units, such as but not limited to hardware, firmware, a combination of hardware and software, software, or software in execution. For example, a module may be, but is not limited to being, a process running on a processor, an object, an executable, a thread of execution, a program, and/or a computer. By way of illustration, both an application running on a computing device and the computing device can be a module. One or more modules can reside within a process and/or thread of execution and a module may be localized on one computer and/or distributed between two or more computers. In addition, these modules can execute from various computer readable media having various data structures stored thereon. The modules may communicate by way of local and/or remote processes such as in accordance with a signal having one or more data packets, such as data from one component interacting with another module in a local system, distributed system, and/or across a network such as the Internet with other systems by way of the signal.

Certain examples, embodiments, and implementations of the disclosed technology are described above with reference to block and flow diagrams of systems and methods according to examples or implementations of certain aspects of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some examples or implementations of the disclosed technology. That is, the disclosed technology includes the performance of some, or all steps of the methods and processes described herein in conjunction with the performance of additional steps not expressly discussed herein. Further, the present disclosure contemplates methods and processes in which some, but not all, steps described herein are performed.

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

Exemplary Use Cases

The following exemplary use cases describe examples of a typical user flow pattern. They are intended solely for explanatory purposes and not limitation.

A sacrificial anode 120 can be placed in a water tank 180 connected to a user's residential water heater system. The sacrificial anode 120 can be attached to a mass sensor 140 disposed therein, and the mass sensor 140 (e.g., a strain gauge) can be in communication with a controller 160. The controller 160, in addition to the mass sensor 140, can be in communication with one or more components of the user's water heater system (e.g., burners, pumps, valves, etc.). The mass sensor 140 can continuously transmit the measured mass data to the controller 160 via a transceiver or other form of communication. The controller 160 can compare the measured mass data to a predetermined threshold to determine if the mass of the sacrificial anode 120 has been depleted. Upon detecting that the mass has fallen below the predetermined threshold, the controller 160 can designate that the sacrificial anode 120 is depleted. Subsequently, the controller 160 can output instructions to the pumps in the water heater system to reduce the circulation flow rate as a corrective action. The controller 160 can also transmit an alert to the user interface 310 on the user's mobile device that the sacrificial anode 120 is depleted and needs maintenance. The controller 160 can also transmit the alert to the user interface 310 on a touchscreen on the water tank 180 or elsewhere on the water heater system. The controller 160 can also schedule a maintenance request with the manufacturer of the water tank 180 and/or the sacrificial anode 120 via a network 150.

A sacrificial anode 120 can be placed on the exterior of a boat's hull in salt water. The sacrificial anode 120 can have a mass sensor 140 disposed therein, and the mass sensor 140 (e.g., a load cell) can be in communication with a controller 160. The controller 160, in addition to the mass sensor 140, can be in communication with a network 150 and connected to a user interface 310. The user interface 310 can comprise a keypad and displays screen on the boat and an application on the boat owner's mobile device. The mass sensor 140 can continuously transmit the measured mass data to the controller 160 via a transceiver or other form of communication. The controller 160 can compare the measured mass data to a predetermined threshold to determine if the mass of the sacrificial anode 120 has been depleted. Upon detecting that the mass has fallen below the predetermined threshold, the controller 160 can designate that the sacrificial anode 120 is depleted. Subsequently, the controller 160 can transmit an alert to the user interface 310 on the user's mobile device that the sacrificial anode 120 is depleted and needs maintenance. The controller 160 can also cause a "maintenance required" indicator light on the display screen and keypad to blink to notify any user of the boat that the corrosion risk is increased.

A sacrificial anode 120 can be placed in a water tank 180 connected to a user's residential water heater system. The sacrificial anode 120 can have a mass sensor 140 disposed therein, and the mass sensor 140 (e.g., a strain gauge) can be in communication with a controller 160. The controller 160, in addition to the mass sensor 140, can be in communication with one or more components of the user's water heater system (e.g., burners, chemical reservoirs, pumps, valves, etc.). The mass sensor 140 can continuously transmit the measured mass data to the controller 160 via a transceiver or other form of communication. The controller 160 can compare the measured mass data to a predetermined threshold to determine if the mass of the sacrificial anode 120 has been depleted. Upon detecting that the mass has fallen below the predetermined threshold, the controller 160 can designate that the sacrificial anode 120 is depleted. Subsequently, the controller 160 can output instructions to a chemical reservoir to add water softener to the water heater system to reduce the corrosion rate of the sacrificial anode 120 as a corrective action. The controller 160 can also transmit an alert to the user interface 310 on the user's mobile device that the sacrificial anode 120 is depleted and needs maintenance. The controller 160 can also instruct the user interface 310 to cause an audible buzzer on the water tank to sound, and the controller 160 can also cause a displays screen of the controller to display an indication that water softener is being added. The controller 160 can also schedule a maintenance request with the manufacturer of the water tank 180 and/or the sacrificial anode 120 via a network 150.

What is claimed is:

1. A corrosion prevention device comprising:
a sacrificial anode in a water tank of a water system;
a mass sensor disposed in an interior channel of the sacrificial anode, the mass sensor comprising an electrical strain gauge configured to measure a strain exerted by a gravitational force acting on a depletable material of the sacrificial anode, wherein the mass sensor is configured to detect a mass of the sacrificial anode, the mass indicative of a depletion of the depletable material; and
a controller in communication with the mass sensor and the water system, the controller being configured to:
receive, from the mass sensor, mass data indicative of a current mass of the sacrificial anode;
determine, based on at least the mass data, that the current mass of the sacrificial anode is below a predetermined threshold; and
output instructions to perform one or more corrective actions comprising one or more of:
transmitting a notification to a user interface,
transmitting instructions to the water system to shut down at least one component of the water system, or
transmitting instructions to the water system to reduce a temperature of water in the water system,
wherein the predetermined threshold is based on a useful life of the sacrificial anode, the one or more corrective actions are emergency corrective actions to minimize corrosion of the water tank when the useful life of the sacrificial anode has expired, and outputting the instructions to perform the one or more corrective actions further comprises:
transmitting instructions to the water system to reduce a flow rate of water through the water system.

2. The corrosion prevention device of claim 1, wherein when the one or more corrective actions comprises transmitting the notification to the user interface, the controller is configured to receive user input from the user interface in communication with the controller, the user input being indicative of the predetermined threshold.

3. The corrosion prevention device of claim 1, wherein the mass sensor is configured to measure strain corresponding to a mass of the sacrificial anode, and wherein the strain is indicative of a degree of corrosion of the sacrificial anode.

4. A controller used in a corrosion prevention system, the controller comprising:
a user interface;
a transceiver;
one or more processors; and
memory storing instructions that, when executed by the one or more processors, cause the controller to:
receive, from a mass sensor disposed in an interior channel of a sacrificial anode in a water tank of a water system, mass data indicative of a mass of the sacrificial anode, the mass sensor comprising an electrical strain gauge configured to measure a strain exerted by a gravitational force acting on a depletable material of the sacrificial anode, the mass indicative of a depletion of the depletable material; and
in response to determining that the mass of the sacrificial anode is below a predetermined threshold, output instructions to perform one or more corrective actions comprising:
transmitting a notification to the user interface,
transmitting instructions to the water system associated with the sacrificial anode, the instructions being to shut down at least one component of the water system, or
transmitting instructions to the water system to reduce a temperature of water in the water system,
wherein the one or more corrective actions further comprise:
transmitting instructions to the water system to reduce a flow rate of water through the water system.

5. The controller of claim 4, wherein the controller is configured to receive user input from the user interface in communication with the controller, the user input being indicative of the predetermined threshold.

6. The controller of claim 4, wherein the mass sensor is configured to measure strain exerted on the mass sensor by the sacrificial anode.

7. The controller of claim 4, wherein the instructions further cause the controller to:
transmit, via the transceiver, a notification to a manufacturer of the water system, the notification being indicative of a request to schedule a maintenance call for the water system, the transceiver being in communication with the manufacturer through a network.

8. The controller of claim 4, wherein:
the predetermined threshold is a first threshold,
the one or more corrective actions is one or more first corrective actions, and
the instructions, when executed by the one or more processors, further cause the controller to:
in response to determining that the mass of the sacrificial anode is below a second threshold, output instructions to perform one or more second corrective actions, the one or more second corrective actions being different from the one or more first corrective actions and comprising one or more of:
transmitting instructions to the water system associated with the sacrificial anode, the instructions being to shut down at least one component of the water system,
transmitting instructions to the water system to reduce a temperature of water in the water system, or
transmitting instructions to the water system to reduce a flow rate of water through the water system.

9. The controller of claim 8, wherein the first threshold and the second threshold are received from the user interface.

* * * * *